United States Patent Office 3,468,706
Patented Sept. 23, 1969

3,468,706
COATED STARCH
Edwin L. Speakman, Clinton, Iowa, assignor to Standard Brands Incorporated, New York, N.Y., a corporation of Delaware
No Drawing. Filed June 22, 1966, Ser. No. 559,388
Int. Cl. C13l; B44d 1/22; D21h 3/28
U.S. Cl. 127—33                                                    7 Claims

ABSTRACT OF THE DISCLOSURE

An ionic or native starch granules are coated with a cationic starch derivative in an amount effective to render the coated granules cationic.

---

This invention relates to the coating of starch with cationic starch and to the resulting product.

Untreated starch contains carboxyl groups which are acidic in nature. In water systems, the carboxyl groups ionize to yield carboxyl radicals still attached to the starch molecule. This radical has an excess of electrons and is, therefore, charged electrically negative. Because the negatively charged radical would be attracted to a positively charged electrode, or anode, it is said to have an anionic character. On the other hand, if the starch has attached to its molecular structure groups which exhibit a positive charge in water systems, such groups would be attracted to a negatively charged electrode, or cathode. This starch is described as cationic in nature.

Cationic starches are prepared by methods which introduce positively charged sites into the starch molecule. The positive charges are carried by chemical groups in such numbers that the slight, negative charge normally present in the untreated granule is overcome, and the entire granule exhibits a cationic nature, in that it will be attracted to a cathodic electrode. It is believed that the substituent groups enter the granule freely and react at random points throughout the granule. Thus, the charged sites are distributed through the granule structure.

Cationic starches are known and have been articles of commerce for many years. Examples of such cationic starches are the amino alkyl starch ethers described in U.S. Patent No. 2,917,506, issued to C. G. Caldwell and O. B. Wurzburg on Dec. 15, 1959, and the nitrogen substituted derivatives of starch described in U.S. Patent No. 2,894,944, issued to E. F. Paschall on July 14, 1959.

The primary use of cationic starch is in the manufacture of paper. Here, the starch is added to a suspension of cellulose fibers and the suspension is filtered on a screen. Normal or untreated starch granules will be retained in the sheet thus formed only by virtue of physical or mechanical entrapment. Only a small proportion of the added starch is retained, however, as the very large volume of water needed in the operation carries most of it out of the sheet. Thus, only a small residue of starch remains to act as an internal size to stiffen the final sheet and give it increased strength.

Cellulose fibers have been shown to have a weak negative electric charge. Because of this, particles having a positive charge will be attracted to the fiber surface and firmly held. Cationic starch, with its strong positive charge, is effectively attracted to cellulose fibers. Thus, when the sheet is formed on a screen, starch is retained due to mechanical entrapment and to the attraction caused by the charge difference between the granule and the fiber. A high percentage of the added starch is retained and greater sizing is obtained from a given use level of starch.

The important factor in this application of cationic starch in paper manufacture is that only the charges occurring at the surface of the granule are effective in attracting the granule to cellulose fibers. Those charges in the interior of the granule are not accessible in this case and so are useless. In fact, these interior charges could just as well not be present at all.

The most convenient way to test starch granules for the nature of the charge they carry is to use a compound which will yield known charged molecules in solution. It is further convenient to use a dye so that the presence of the material on the granule may be easily observed by means of the color. For example, it can easily be demonstrated that the dye, Methylene Blue, forms a solution of positively charged molecules. Thus, this dye will be attracted to granule surfaces which exhibit a negative charge. The dye, Light Green SF Yellowish, furnishes negatively charged molecules when dissolved in water. These molecules will be attracted to starch surfaces which are charged positively. The test, then, is simply to mix a small amount of starch sample into water at a pH near neutral, add a small amount of dye, and either observe the granules by means of a microscope to see whether they are stained, or wash the granules by centrifuging. If the granule surface and the dye have opposite charges, the dye will be retained strongly enough that it will not wash off. For example, if the starch sample retains SF Yellowish and rejects Methylene Blue, it has a positively charged surface and is said to be cationic.

The price of cationic starches of current commercial production is about twice that of the usual starches employed in the papermaking industry. Doubling the cost of the starch makes most users hesitant about using cationic starches because they usually do not correspondingly double the efficiency, and the cost per pound of paper is increased.

An object of this invention is to provide a starch product in granule form, having a coating of a positively charged carbohydrate material which imparts a cationic charge to the coated granule.

Another object is to provide a new process for the application of charged sites to the surface of granular starch.

A particular object is to coat granular starch with a dispersible carbohydrate derivative containing a substantial proportion of chemical groups capable of ionizing to yield positively charged sites.

A further object of this invention is to provide a method to reduce the cost of manufacturing starch in granular form exhibiting a cationic nature.

The starch to be coated may be untreated starch or a modified starch or starch derivative that is anionic or neutral.

I have discovered that by coating starch granules with a small proportion of pasted cationic starch, a product is obtained which exhibits the granule behavior of pure cationic starch. A convenient way of coating is to add pasted cationic starch to uncooked starch granules in aqueous slurry and then recover the starch by filtration and drying. The explanation for the cationic behavior is postulated as attraction of the dispersed cationic starch molecules to the slightly negatively charged surface of the raw starch granule so that the new surface consists of a thin layer of cationic starch. This coated starch is capable of taking up and retaining Light Green SF Yellowish dye, and completely rejecting Methylene Blue dye. In contrast, the original uncoated granule starch only slightly retains Methylene Blue, which characteristic is indicative of weak negative charges. Further, the coated starch appears to be attracted to cellulose fibers as well as pure cationic starch. Thus, in applications where cationic starch is employed in granule form, the cationic coated starch should perform equally well.

The amount of cationic starch used in my process may vary over a wide range. It is not necessary to use more than the minimum required to change the charge on the starch granule. A very thin coating is sufficient. Thus the cost of the new product is but a fraction of that of the expensive cationic starch. Larger amounts may be used but are not necessary and are not recommended for reasons of economy.

In order to more clearly describe the nature of the present invention, specific examples will hereinafter be described. It should be understood however, that this is done solely by way of example and is intended neither to delineate the scope of the invention nor limit the ambit of the appended claims. In the examples and throughout the the specification, percentages are intended to refer to percent by weight unless otherwise specified.

Example 1

A slurry of untreated corn starch was prepared, containing 35.54% by weight of dry basis starch and having a pH of 6.2. To this slurry at room temperature was added enough of a 5% paste of cationic starch to give a cationic starch concentration of 2% by weight based on the dry basis untreated starch. The slurry was stirred to insure thorough mixing of the added pasted starch. The slurry was then filtered and the resulting cake was puddled and dried.

The cationic starch paste was prepared for the above addition by suspending cationic starch (having 0.03 mole of nitrogen per anhydroglucose unit) in water to make a slurry containing 5% by weight of starch, heating to about 207° F. and holding for 15 minutes at this temperature. This paste was then cooled to about 145° F. and immediately added to the untreated starch slurry at a slow rate under vigorous agitation.

The cationic starch was prepared by adding sufficient caustic-salt solution (containing 6.9 g. of sodium hydroxide and 25.6 g. of sodium chloride per each 100 ml. of the solution) to a 35.54% solids slurry of untreated corn starch to impart a slurry alkalinity of 14.0 milli-equivalents of alkali per 100 ml. of slurry (or 55.12 milli-equivalents of sodium hydroxide per anhydroglucose unit), heating the alkaline slurry to 128° F., and adding 3.24% of glycidyl-diethyl amine by weight (0.040 mole per anhydroglucose unit) based on the dry basis starch. After 16 hours of reaction time at 128° F. under constant agitation, the slurry was neutralized to pH 6 with muriatic acid, the product was recovered by filtering and the cake was thoroughly washed with water. The cake was dried in a laboratory model Proctor & Schwartz drier of the forced-air type, set ot 160° F.

The cationic property of the coated product of this example was determined by means of a dye absorption technique. A small amount of the product (about 0.1 g.) was placed in a 4-inch test tube and suspended in sufficient distilled water to almost fill the tube. Three drops of 0.1% aqueous solution of Light Green SF Yellowish were added to the tube and mixed in by inverting. A similar preparation was made using Methylene Blue dye. The starch was then separated by centrifugation, the supernatant was discarded, and the starch was resuspended again in distilled water. Centrifugation and resuspension were continued for 10 to 12 cycles. The retained dye indicated the kind of charge on the starch granule. Thus, the strong retention of SF Yellowish showed the presence on the granule of positively charged sites. Methylene Blue was completely washed out, leaving the starch with its original white color.

The cationic behavior of my coated starch was also demonstrated by a test designed to show how well the starch is attracted to cellulose fibers. A suspension of cellulose fibers was prepared for this test by vigorouly beating filter paper in water. The stock suspension was diluted to provide a very dilute mixture for use. The fiber size was such that the fibers would settle slowly, leaving a clear supernatant. On adding a small proportion of untreated starch in granule form and thoroughly mixing it into the diluated suspension, the fibers settled as when no starch was present, but the supernatant remained cloudy due to the still-suspended starch granules. Attraction to the fibers had not occurred. In sharp contrast to this behavior, the addition of a like proportion of pure cationic starch resulted in clumping of the fibers and very rapid settling, leaving the supernatant clear. It was obvious that the cationic starch granules were strongly attracted to the cellulose fibers. The addition of my cationic coated starch to a fiber suspension under the same conditions resulted in the same behavior exhibited by the pure cationic starch. This showed that the small proportion of cationic starch located on the surface of the otherwise untreated starch granule made the entire granule function in the same way as the granule which consisted entirely of cationic starch.

Example 2

A slurry containing 39.09% by weight of untreated corn starch was heated to 120° F. under agitation and sufficient caustic-salt solution (containing 6.9 g. of sodium hydroxide and 25.6 g. of sodium chloride per each 100 ml. of the solution) was added to provide a sodium hydroxide concentration of 48.66 milli-equivalents per anhydroglucose unit, corresponding to an alkalinity of 13.82 milli-equivalents of alkali per 100 ml. of slurry. To this alkaline slurry was added 4% by weight of 2-chloro-N,N-diethyl-ethyl amine hydrochloride. This is equivalent to 37.76 milli-moles per anhydroglucose unit. The reaction was allowed to proceed for 4 hours at 120° F. with constant agitation. Then the slurry was neutralized with muriatic acid to pH 3, and was filtered on a Buchner vacuum filter. The cake was resuspended to approximately original volume, the slurry was filtered, and the cake was washed, puddled and dried. Analysis showed the product had a nitrogen content of 0.029 mole per AGU and strongly absorbed SF Yellowish dye. When this product was cooked and used to coat untreated, raw starch granules in the manner described in Example 1, the coated starch also strongly absorbed SF Yellowish dye.

Example 3

A cationic starch was made with 2-chloro-N,N-diethyl-ethyl amine hydrochloride in the manner described in Example 2, except that the starch used was an acid modified material referred to as 90 Fluidity starch. The finished product had a nitrogen content of 0.028 mole per anhydroglucose unit. When the product was pasted and used to coat untreated starch granules in the manner described in Example 1, a coated starch was obtained which strongly absorbed SF Yellowish dye.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. Anionic or native starch granules coated with a cationic starch derivative in an amount effective to render the coated granules cationic.

2. A product as claimed in claim 1, wherein the starch granules are coated with a pasted cationic starch derivative.

3. A product as claimed in claim 1, wherein the cationic starch derivative is an amino alkyl starch ester or a nitrogen substituted derivative of starch.

4. A product as claimed in claim 1 wherein the starch granules are granules of unmodified starch.

5. A product as claimed in claim 4, wherein the starch granules are coated with a pasted cationic starch derivative.

6. Method of preparing cationic coated starch which comprises coating anionic or native starch granules with a small amount of a pasted cationic starch derivative, said amount of cationic starch effective to render the coated granules cationic.

7. A method as claimed in claim 6 wherein the coating step is carried out by mixing a pasted cationic starch derivative with an aqueous slurry of anionic or native starch granules, filtering the slurry and drying the coated granules.

References Cited

UNITED STATES PATENTS

| | | | |
|---|---|---|---|
| 2,813,093 | 11/1957 | Caldwell et al. | 260—233.3 |
| 2,894,944 | 7/1959 | Paschall | 260—233.3 |
| 2,917,506 | 12/1959 | Caldwell et al. | 260—234 |
| 2,965,518 | 12/1960 | Meisel | 117—165 X |
| 3,051,700 | 8/1962 | Elizer et al. | 117—165 X |
| 3,320,118 | 5/1967 | Black et al. | 260—233.3 X |

OTHER REFERENCES

D. S. Greif: Tappi, 43 (3), 254–260 (March 1960).

MORRIS O. WOLK, Primary Examiner

SIDNEY MARANTZ, Assistant Examiner

U.S. Cl. X.R.

106—210; 117—165; 127—29; 162—175; 260—233.3